(12) United States Patent
Von Wolfsheild

(10) Patent No.: US 7,580,917 B2
(45) Date of Patent: Aug. 25, 2009

(54) SYSTEM AND METHOD FOR BROKERING INFORMATION BETWEEN A PLURALITY OF COMMERCIALLY DISTINCT CLIENTS

(75) Inventor: Baron R. K. Von Wolfsheild, La Tuna Canyon, CA (US)

(73) Assignee: Prolific Publishing, Inc., Burbank, CA (US)

( * ) Notice: Subject to any disclaimer, the term of this patent is extended or adjusted under 35 U.S.C. 154(b) by 444 days.

(21) Appl. No.: 11/386,340

(22) Filed: Mar. 22, 2006

(65) Prior Publication Data

US 2007/0226221 A1 Sep. 27, 2007

(51) Int. Cl.
*G06F 7/00* (2006.01)
(52) U.S. Cl. .............................. 707/1; 707/10
(58) Field of Classification Search ............... 707/1–10, 707/100–103
See application file for complete search history.

(56) References Cited

U.S. PATENT DOCUMENTS

| | | | |
|---|---|---|---|
| 5,257,369 A | 10/1993 | Skeen et al. | 719/312 |
| 5,491,818 A | 2/1996 | Malatesta et al. | 707/201 |
| 5,615,372 A | 3/1997 | Nishina | 713/100 |
| 5,629,980 A | 5/1997 | Stefik et al. | 705/54 |
| 5,752,242 A | 5/1998 | Havens | 707/3 |
| 5,873,103 A | 2/1999 | Trede et al. | 707/204 |
| 5,907,837 A | 5/1999 | Ferrel et al. | |
| 5,940,805 A | 8/1999 | Kopp | 705/26 |
| 5,974,417 A | 10/1999 | Bracho et al. | 707/10 |
| 6,044,372 A | 3/2000 | Rothfus et al. | 707/10 |
| 6,304,874 B1 | 10/2001 | Corley et al. | 707/10 |
| 6,718,332 B1 | 4/2004 | Sitaraman et al. | 707/102 |
| 6,732,180 B1 | 5/2004 | Hale et al. | |
| 6,807,542 B2 | 10/2004 | Bantz et al. | 707/9 |
| 2001/0043616 A1 | 11/2001 | Hild et al. | 370/471 |
| 2002/0165812 A1 | 11/2002 | Lukose | 705/37 |
| 2003/0177356 A1* | 9/2003 | Abela | 713/168 |
| 2003/0204480 A1* | 10/2003 | Heinrichs et al. | 707/1 |
| 2006/0173985 A1* | 8/2006 | Moore | 709/223 |

FOREIGN PATENT DOCUMENTS

JP 61075957 4/1986

OTHER PUBLICATIONS

International Search Report mailed Jun. 10, 2008, International application No. PCT/US07/07125.

* cited by examiner

*Primary Examiner*—Wilson Lee
(74) *Attorney, Agent, or Firm*—Gates & Cooper LLP

(57) ABSTRACT

A method, apparatus, article of manufacture, and a memory structure for brokering information between a plurality of clients using identifiers defining a plurality of data constructs is disclosed. An exemplary method comprises accepting a new data construct from an authoring entity, assigning a globally unique identifier to the new data construct, storing the new data construct and the assigned globally unique identifier in a database, and brokering between the authoring entity and a second entity commercially distinct from the authoring entity to provide the second entity access to the new data construct by reference to the assigned globally unique identifier of the new data construct or to provide the authoring entity access to an at least one of a plurality of pre-existing data constructs for use with the new data construct by reference to a globally unique identifier of the existing data construct.

48 Claims, 8 Drawing Sheets

SYSTEM AND METHOD FOR BROKERING INFORMATION BETWEEN A PLURALITY OF COMMERCIALLY DISTINCT CLIENTS

BACKGROUND OF THE INVENTION

1. Field of the Invention

The present invention relates to systems and methods for storing and retrieving data and in particular to a system and method for brokering information between a plurality of clients.

2. Description of the Related Art

A database is an organized collection of data, gathered together into discrete records. Data can be retrieved and/or sorted and consulted to obtain information or generate reports. To facilitate better retrieval and sorting of data, each record is usually organized as a set of data elements. Access to the database to store, retrieve, and change records is typically provided to local or remote clients via a database management system (DBMS). Databases may be relational (RDBMS), object (ODBMS), or object-relational (OR-DBMS).

The structure and type of data held in the database is defined by the database's schema. The schema may also describe any mathematical or logical relationships among them. Some schemas provide for security and data validation. For example, a schema may be defined that only allows a particular element of a record to have positive integers. Or, a schema may be defined that confirms that if one column is filled with data; a second column is filled with data as well.

The majority of the effort involved in building and maintaining a database is typically the collection of the data itself. To avoid duplication of effort, it is often desirable to share existing database information among databases managed by different commercial entities. Unfortunately, the information requires an efficient means to implement such sharing.

For example, rather than generate separate contact lists for use in different application/OS/devices, an existing contact list may be moved from one application/OS/device to another (e.g. from a personal computer to a handheld/PDA, or cell phone).

If the source and destination databases have the same schema or are designed to be compatible (e.g. if they have matching export/import modules or are designed to the same interchange standard), the data may be moved directly from the source to the destination without transformation or loss of data. The problem, however, is that there is a great deal of data resident in databases with incompatible schemas.

If the source and destination databases have dissimilar schemas or are otherwise incompatible, data may be transferred by exporting the data from the source system to an intermediate low-level format (typically with the loss of some data) and importing the data, expressed in the low level format, into the destination.

For example, a popular low-level interchange format is the comma separated value (CSV) format. Like most low-level interchange formats, CSV does not encode the nature of the data (e.g. if it is a binary number or alphabetical only text) but rather simply the most readable interpretation of the data. It is left to the destination application to resolve the encoding of the data, and to store the encoded data in an internal representation.

To resolve such encoding issues, destination applications may rely on assumptions about the format of imported data. However, even subtle discrepancies in the database schema . . . even column headings . . . can prevent the direct transportation of information from the source to the destination. For example, it might be assumed that a person's name would be stored in three separate columns with corresponding column headings such as "first," "middle," and "last". However, the source application might label the first name column "FirstName" while the second application expects "Name1." In addition, even the language of a given country may conflict between otherwise identical applications, and user defined fields (UDFs) have almost no hope of being transported without human interaction. Hence, the resolution of such encoding issues typically requires significant human interaction (either by writing code to transform the data from the low-level format to the appropriate destination format or by altering the data itself). It may also result in the loss of data in the transformation to the low-level interchange format.

Importing data from one database to another also involves a duplication of data. That is . . . data that is stored in the first database is transformed if necessary, and copied to the second database. While this duplication has its advantages in some cases, it is disadvantageous in others because it increases the storage requirements of the second database, and may implicate security issues. While data stored in one database may be useful to a second database, the data stored in the first database is of a sensitive nature, and wholesale migration of that data from the first database to the second database may be impermissible for privacy or security issues. This difficulty is especially likely when one of the first and second databases are managed and/or controlled by different commercial entities, since any privacy agreement effective with the owner of one database will not necessarily permit the same use by another commercial entity.

The foregoing lack of schema standardization (including column headings that reflect the data content) is further exacerbated by a lack of any connected method for encoding the relationship of data between databases and any required supporting code or logic. These difficulties make it especially difficult for different commercial entities to share database information.

Further, even if an efficient means for sharing information among databases managed by different commercial entities existed, there is no efficient and flexible means for informing other users that such information exists and is available for use, or for otherwise brokering the provision of such data between different commercial entities.

U.S. Patent publication 2002/0165812, for example, discloses a system and method for selling contingent information. However the disclosed database does not include a globally unique identifier part of the database itself rather than merely index to items in the database. Consequently, the system does not permit one data construct to use and be used by other data constructs authored by other entities.

U.S. Pat. No. 5,491,818, issued Feb. 13, 1996 to Malatesta et al, discloses a system for migrating application data definition catalog changes to a system level data catalog. This system does not use a globally unique inter-database identifier for each data construct, nor is that identifier used to allow one data construct to use and be used by another data construct authored by a commercially distinct entity.

U.S. Pat. No. 5,629,980, issued May 13, 1997 to Stefik et al., discloses a digital work distribution system. The system permits the owner of the digital work to offer it to others, but does not utilize anything analogous to a globally unique identifier, which provides a reference for one data construct to use and be used by other data constructs from other entities.

U.S. Pat. No. 5,752,242, issued May 12, 1998 to Havens, discloses a system and method for automated retrieval of information. Information sources include user parameters that specify user attributes. A library includes filters that each specify one or more parameters for an associated attribute, and a translator selects filters from the library based on the user parameters. This however, does not disclose a globally unique identifier that provides a reference for one data construct to be used by other data constructs from commercially distinct entities.

U.S. Pat. No. 5,974,417, issued Oct. 26, 1999 and U.S. Pat. No. 6,044,372, issued Mar. 28, 2000 disclose systems and methods for publishing events to a network in which publishers publish information which subscribing entities can subscribe. These references, however also do not disclose a system that allows one data construct to use and be used by others by reference to a globally unique identifier in a brokering context.

U.S. Pat. No. 6,304,874, issued to Corley et al. on Oct. 16, 2001, discloses an access system for distributed storage. An indexing system is used, but the index is not globally unique between databases, and is not part of the database information itself (the index sits outside the database, pointing to data therein). Since the index is not part of the database, it cannot be used by one data construct to use or be inferentially used by another data construct.

What is needed is an efficient and reliable brokering system for governing and encapsulating both the data and connected code constructs so that database work products can be built upon and exchanged. The present invention satisfies these needs.

SUMMARY OF THE INVENTION

To address the requirements described above, the present invention discloses a method, apparatus, article of manufacture, and a memory structure for brokering information between a plurality of clients using identifiers defining a plurality of data constructs. In one embodiment, the method comprises accepting a new data construct from a authoring entity; assigning a globally unique identifier to the new data construct; storing the new data construct and the assigned globally unique identifier in a database; and brokering between the authoring entity and a second entity commercially distinct from the authoring entity to provide the second entity access to the new data construct by reference to the assigned globally unique identifier of the new data construct, or to provide the authoring entity access to an at least one of a plurality of pre-existing data constructs for use with the new data construct by reference to a globally unique identifier of the existing data construct.

The apparatus comprises a data processor communicatively coupled to a memory storing instructions for accepting a new data construct from a authoring entity; assigning a globally unique identifier to the new data construct; storing the new data construct and the assigned globally unique identifier in a database; and brokering between the authoring entity and a second entity commercially distinct from the authoring entity to provide the second entity access to the new data construct by reference to the assigned globally unique identifier of the new data construct, or to provide the authoring entity access to an at least one of a plurality of pre-existing data constructs for use with the new data construct by reference to a globally unique identifier of the existing data construct.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
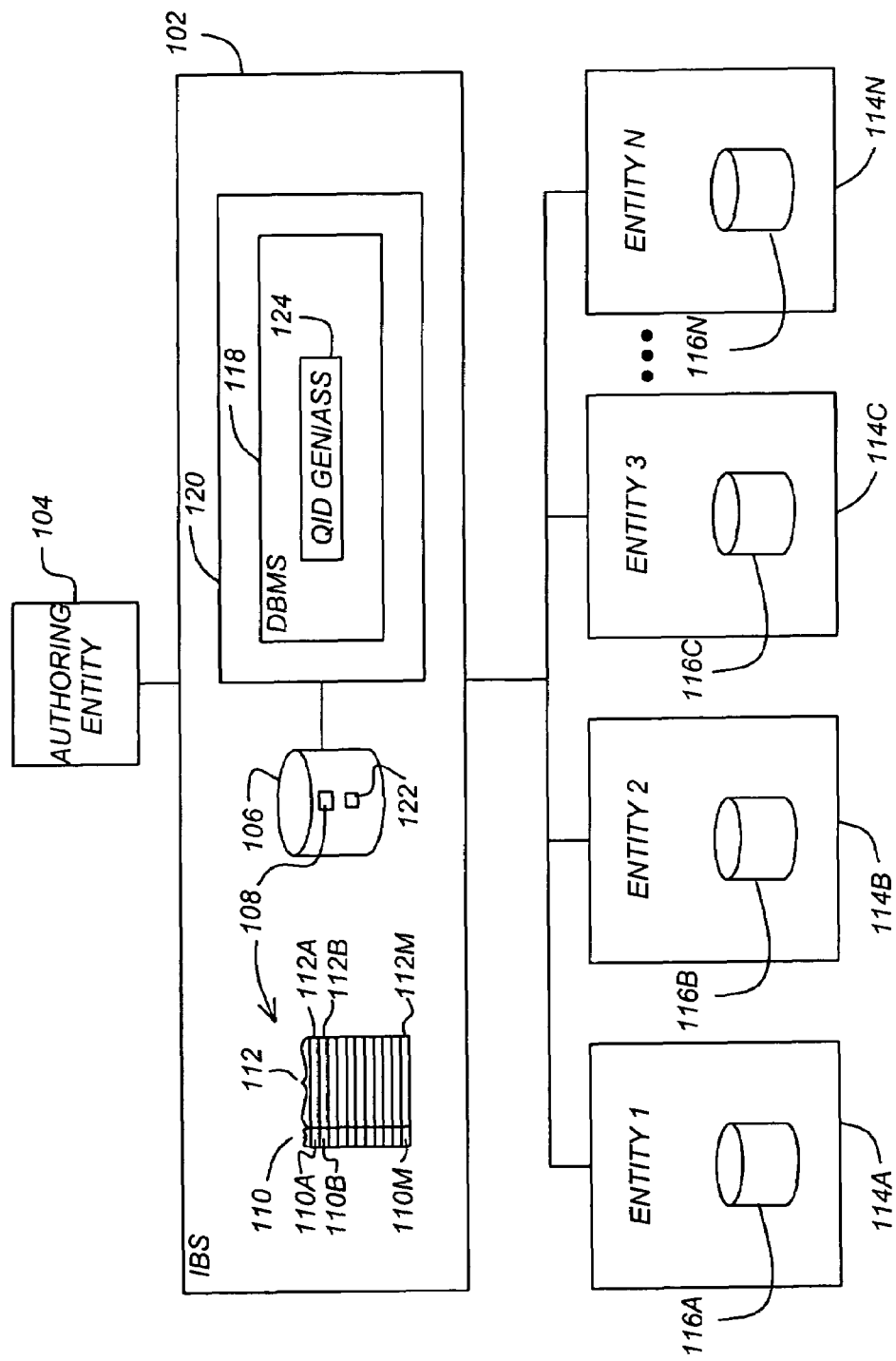
FIG. 1 is a block diagram illustrating one embodiment of an information brokering system.

FIG. 1 is a diagram illustrating one embodiment of a information brokering system (IBS) 102 that brokers information between an authoring entity 104 and one or more other entities 114A-114N. In one embodiment, the IBS 102 comprises one or more storage devices 106 storing database information in the form of data constructs 122, an index 108, and other information. The index 108 relates an identifier 110A-110M (hereinafter alternatively referred to as QIDs 110) with metadata 112 describing each data construct 122. The IBS 104 also comprises a processor 120 implementing a DBMS 118. The DBMS 118 comprises a QID generator/assignor 122 which generates and assigns the QID 110. The QID is globally unique (to the IBS 102, at least) and is described further below.

The authoring entity 104 can communicate with the IBS 102 via any suitable means, including wired or wireless communications. In one embodiment, communication between the IBS 102 and the authoring entity 104 is accomplished via the Internet.

The IBS 102 is also communicatively coupled with a plurality of other entities 114A-114N (hereinafter alternatively referred to as entities 114), each having a respective database 116A-116N of information that can be shared with other entities 114 or the authoring entity 104 via the IBS 102 as described below. In one embodiment, entities 114 are commercially distinct from the authoring entity 104 and from each other entity 112. Thus, without the IBS 102, the authoring entity 104 and entities 114 would not be sharing information between each other.

Figure 2:
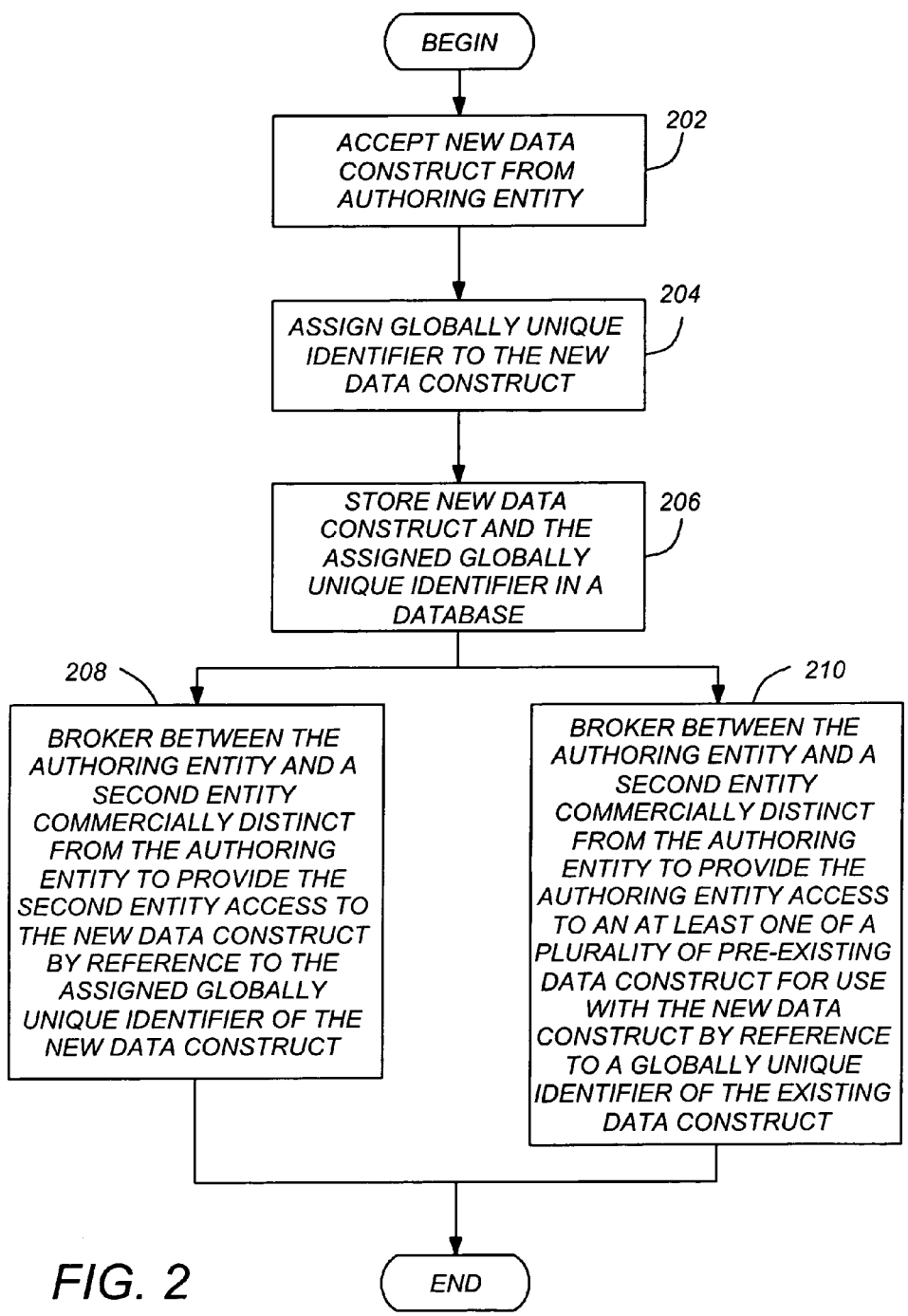
FIG. 2 is a flow chart presenting an illustrative example of process steps that can be used in brokering information between entities.

FIG. 2 is a flow chart presenting an illustrative example of process steps that can be used in brokering information between entities 102, 114. In block 202, a new data construct 122 is accepted from an authoring entity 104. The term "authoring entity" is used to refer to the entity supplying the new data construct 122 to the IBS 102, and may be either the author or simply the supplier of the new data construct 122. In block 204, a globally unique (at least to the IBS 102) identifier is assigned to the new data construct 122.

Figure 3:
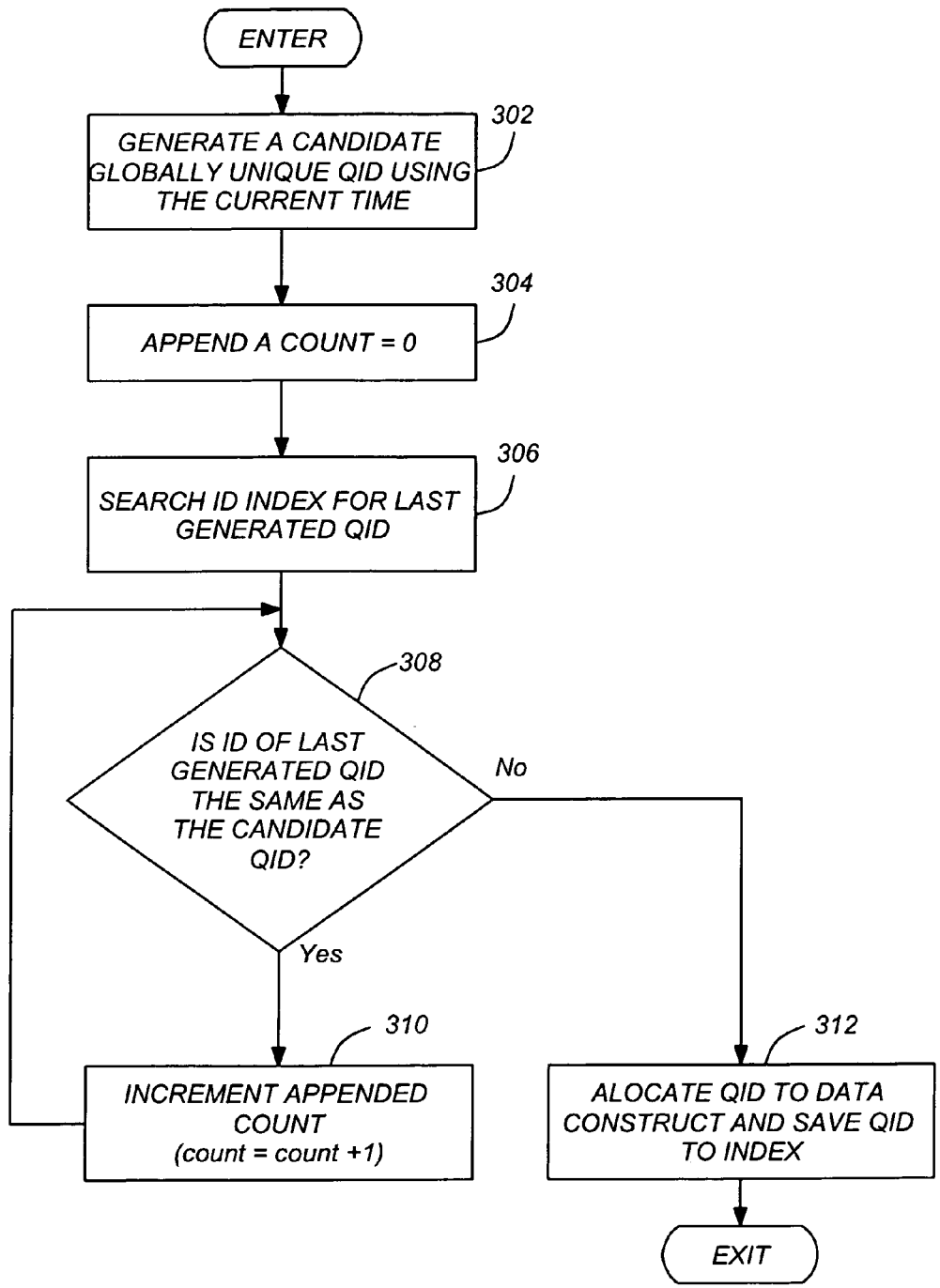
FIG. 3 is a flow chart presenting an illustrative example of process steps used in generating a globally unique identifier for a data construct.

FIG. 3 is a flow chart presenting an illustrative example of process steps that can be used in generating and assign a globally unique identifier for a data construct. A globally unique identifier 110 can be defined by selecting the identifier from a pool of identifiers, or by generating one in such as way so as to assure the identifier is unique.

In the embodiment illustrated in FIG. 3, the QID is a numeric value that is generated based upon the current time. As shown in block 302, a candidate QID is generated using the current time. In this context, the "current time" can be the time of day (whether expressed in a 24 hour day or a 12 hour day) and may also include the year, month, and day. For example, if the current time of day is 12:04:05.02 AM on Dec. 24, 2005, the candidate QID may be 2005122412040502. Other methods of generating a candidate QID may be used as well, including simply generating it from a counter or even a random number generator.

In block 304, the QID index 108 is searched to find the most recently generated QID 110. Block 306 determines whether the most recently generated QID is the same as the candidate QID. If so, the QID for the candidate QID is incremented an stored to the index 108 as shown in blocks 314 and 312. If not, the candidate QID is assigned to the new data construct and stored in the index 108.

Figure 4:
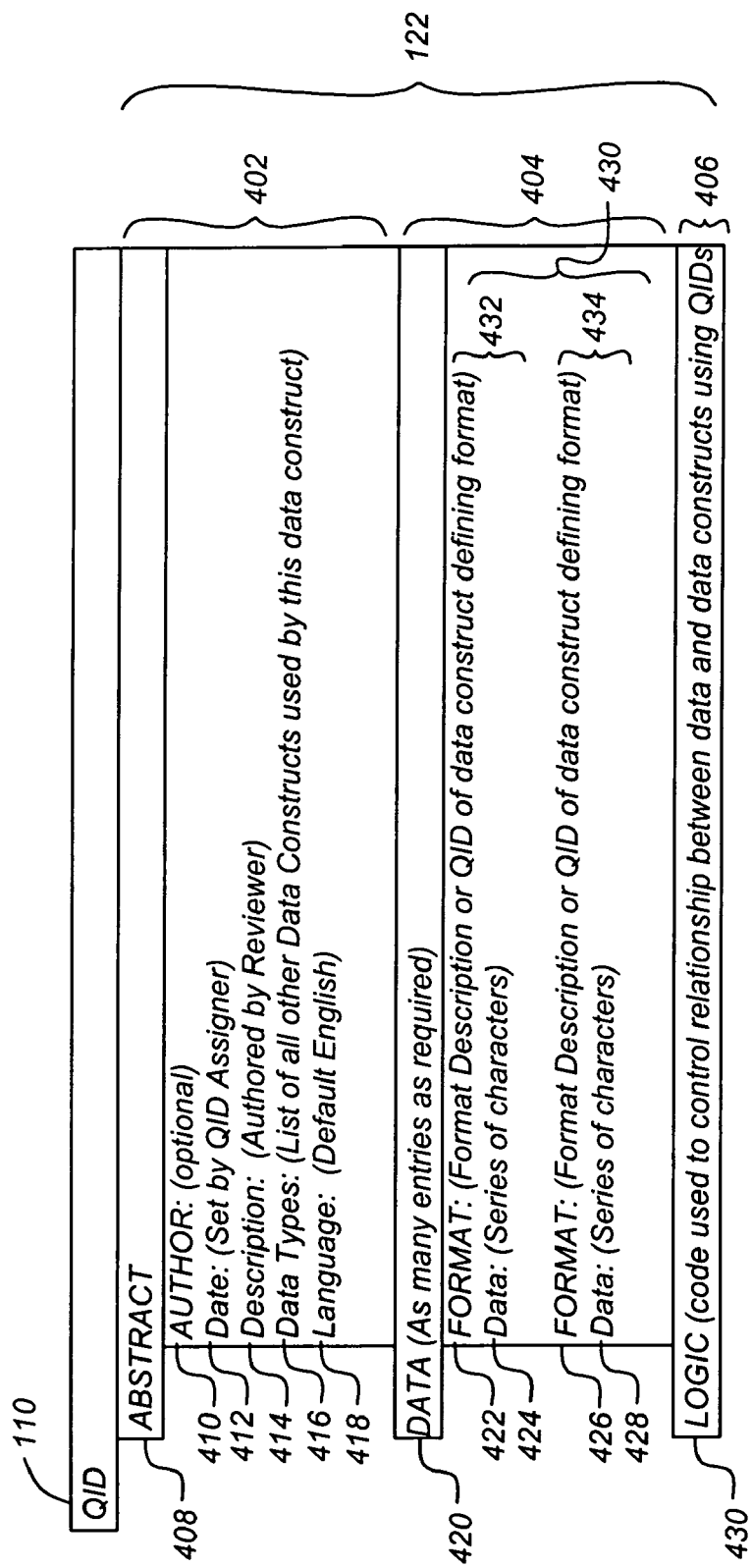
FIG. 4 is a diagram illustrating one embodiment of a data construct.

FIG. 4 is a diagram showing one embodiment of a data construct 122 and its associated QID 110. The data construct 122 comprises an abstract section 402 and either a data section 404, a logic section 430, or both a data and logic section 404, 430. Although the exemplary data construct 122 shown in FIG. 4 has only one data section, and one logic section 430, the data construct may comprise a plurality of data sections and/or logic sections.

The abstract section 402 may include: an optional title field 408 to describe the section; an optional author field 410 for identifying the authoring entity; an optional date field 412 which may be set by the QID generator/assignor 124 when the QID 110 for the data construct 122 is generated; a data type field 416, which includes the QID of each other data construct stored in the IBS 102 used by the data construct 122; and an optional language field 418.

The data section 404 includes an optional title field 420, one or more entries 432, 434 collectively representing a data set 430 of the data construct 122. Each entry comprises a data field 424, 428 having a portion of the data in the data set 430 and a respective format field 422, 426 describing the format of the data in the data field 424, 428 directly, or via reference to a QID of another data construct that provides the format definition. For example, if it is desired that the format of the data entered into the data field 424 be a series of 5 integers, the format may be indicated as NNNNN. If the format of the data entered in to the data field 424 is to be a series of 5 alphanumeric characters, the format may be indicated as AAAAA. A telephone number, for example, may be indicated as (NNN) NNN-NNNN. Or, as will be discussed in a particular example below, the format field 422 may include the QID referring to another data construct with data describing the format of the data in the data field 424. For example, the format field 422 may include a QID of "7" and the data construct associated with a QID of "7" may have "NNNNN-NNNN" for a data field 424. Thus, the format for the instant QID will be "NNNNN-NNNN".

The logic section 430 includes instructions and/or data used to define and implement a desired relationship between the data in the data field 424 of the data construct 122, and output data from the data construct 122. This desired relationship can be expressed in terms of the data in the data field 424 of the data construct 122 and/or data and information from other constructs via reference to that data construct's QID. Thus, the logic section 430 defines an output of the data construct 122 as a function of at least one of a QID of another (and existing) data construct.

Figure 5:
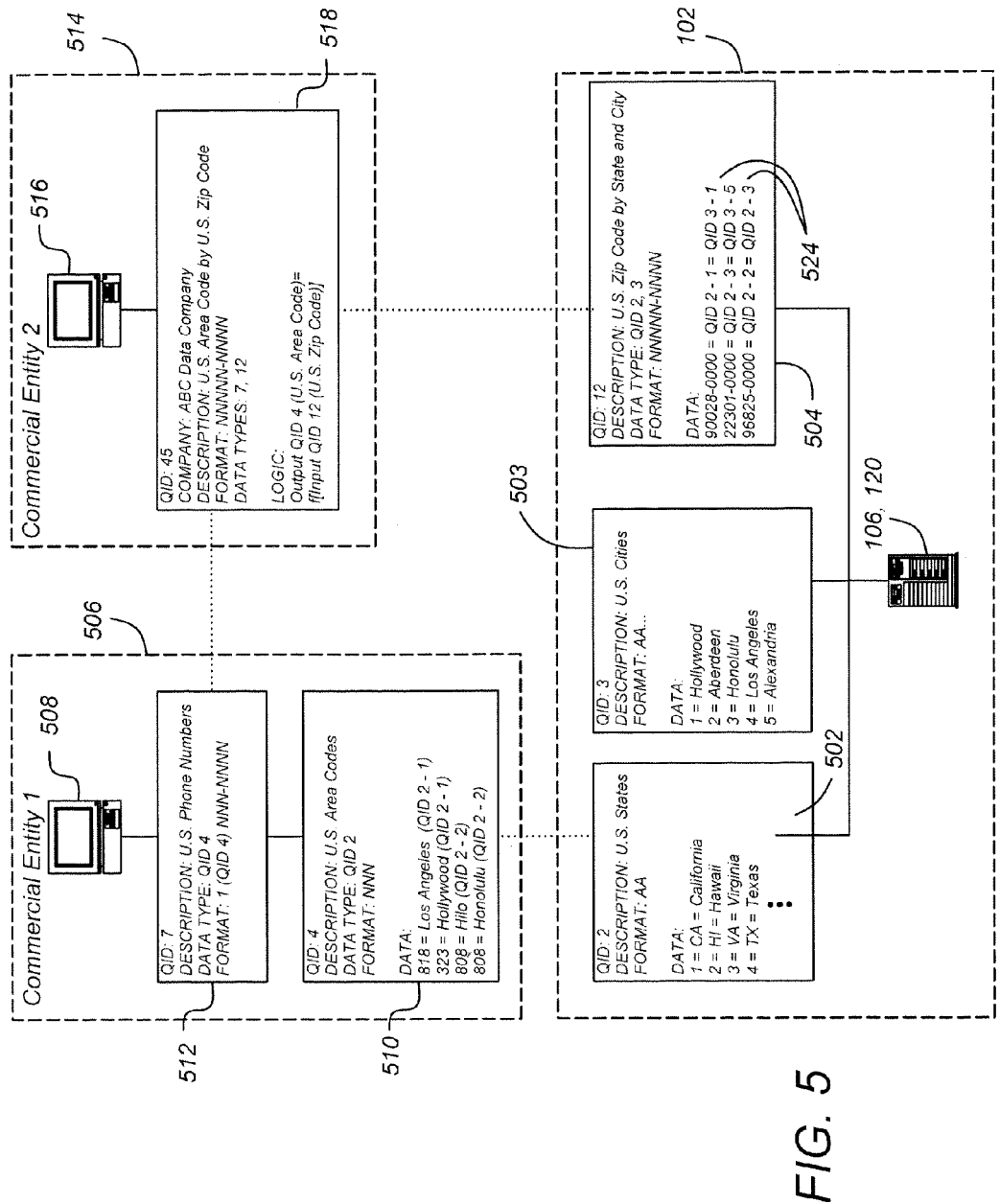
FIG. 5 is a diagram illustrating the application and sharing of data constructs between different entities.

FIG. 5 is a diagram illustrating examples of data constructs and the brokering thereof by the IBS 102 via the use of QIDs. Using the IBS, 102, an authoring entity creates two data constructs 502, 504.

The first data construct 502 has an abstract section 402 with a null author field 410 and a null date field 412. Its description field 414 indicates that the data construct represents "U.S. States". Data can be entered into the description field 414 initially by the authoring entity, but this data may be subject to review by the IBS 102 to assure that the description accurately and completely describes the construct. This review can be accomplished manually by an individual interfacing with a computer in the IBS 102 or it may be automated to some extent. For example, if the format of the data construct is "NNNNN" and the description field 414 indicates that the data construct is "ZIP CODS", the IBS 102 reasonably assume that the description should read "ZIP CODES". The IBS 102 may highlight this error for an individual to correct the error, it may correct it automatically, or correct it automatically and give the individual the option of retaining the original entry. The IBS may also evaluate the data in the description field 414 based upon other information as well. For example, any reference to other data constructs may provide information that can be used to determine if a construct is correctly described. If a data construct referred to another which was described as brands of motor oil, the IBS 102 may reasonably infer that the description for that data construct would not be accurately described as "muffin recipes".

This data construct 502 does not use data from any other data construct, therefore, the data type field 416 is null as well. Finally, the default language (English) is used, so the language field 418 is also null.

The data section 404 of the first data construct 502 includes a "AA" in the format field 422, indicating that the format for the data in the associated data field 424 is two serial alphanumeric characters. The data field 424 defines a "1" as "CA" or "California", and a "2" as "HI" or "Hawaii".

Data construct 503 has an abstract section with a null author field 410 and a null date field 412. Its description field 414 indicates that the data construct represents "U.S. Cities," and the "AA . . . " in its format field 422 indicates that it is, alphabetical, and is of undetermined length. The data field 424 defines a "1" as "Hollywood," a "2" as "Aberdeen," a "3" as "Honolulu," a "4" as "Los Angeles," and a "5" as "Alexandria."

Data construct 504 has an abstract section with a null author field 410 and a null date field 412. Its description field 414 indicates that the data construct represents "U.S. Zip Codes by State and City". Unlike the first data construct 502, the second data construct 504 uses data from the first and second data constructs 502 and 503 (e.g. QIDs 2 and 3). Therefore, the data type field 416 recites QID 2 and QID 3. As was true with the first data construct 502, the second data construct 504 is written in the default language (English), and the language field 418 is therefore also null.

The data section 404 of the second data construct 504 includes a "NNNNN-NNNN" in the format field 422, indicating that the format for the data in the associated data field is 5 integers, a dash, and 4 integers. The data field 424 defines a number of Zip codes, including 90000-0000, which by reference to QID 2, is related to a State, and by reference to QID 3, is related to a U.S. City. Referring to the first data construct 502 (referenced by QID 2), entry "1" was associated with CA or California, and entry "2" was associated with HI or Hawaii, and entry "3" with VA or Virginia. The second data construct 504 relates its data with the State data in the data construct 502 via reference to QID 2 and the city data in data construct 526 via reference to QID 3. Reference to each individual data entry of the first data constructs accomplished via an index. In the example shown in FIG. 5, the Zip Code data "90028-0000" is associated with the value of QID 2 having an index of "1"—that is, "CA" or "California" and the QID 3 having an index of "1," representing "Hollywood." Also, the Zip code data "22301-0000" is associated with the value of QID 2 having an index of "3"—that is, "VA" or "Virginia," and the value of QID 3 having an index of "5" or "Alexandria". Similarly, the Zip code data "96825-0000" is associated with the value of the QID 2 having the index "2" ("HI" or "Hawaii"), and the QID 3 having an index of "3" ("Honolulu").

Of course, the data values listed in data construct 504 may also be data ranges. For example, if the Zip codes for California extended from 90000-0000 to 95000-0000, those values can be entered into the data construct.

It is noted that data constructs 502, 503, and 504 are data constructs that are likely to be frequently used by many entities. Data constructs that have wide application to other data constructs (which may be referred to as baseline constructs) can be reserved and associated with a list of reserved QIDs. These baseline or reserved QIDs may be made available to all entities free of charge, if desired. Baseline data constructs can include one or more of unformatted data types, telephone number data types, name data types, address data types, and the like. Baseline data constructs can be identified when they are created, or the database of data constructs can be searched to identify frequently used, requested, or invoked data constructs, and to identify those data constructs and their associated QIDs as reserved.

Figure 6:
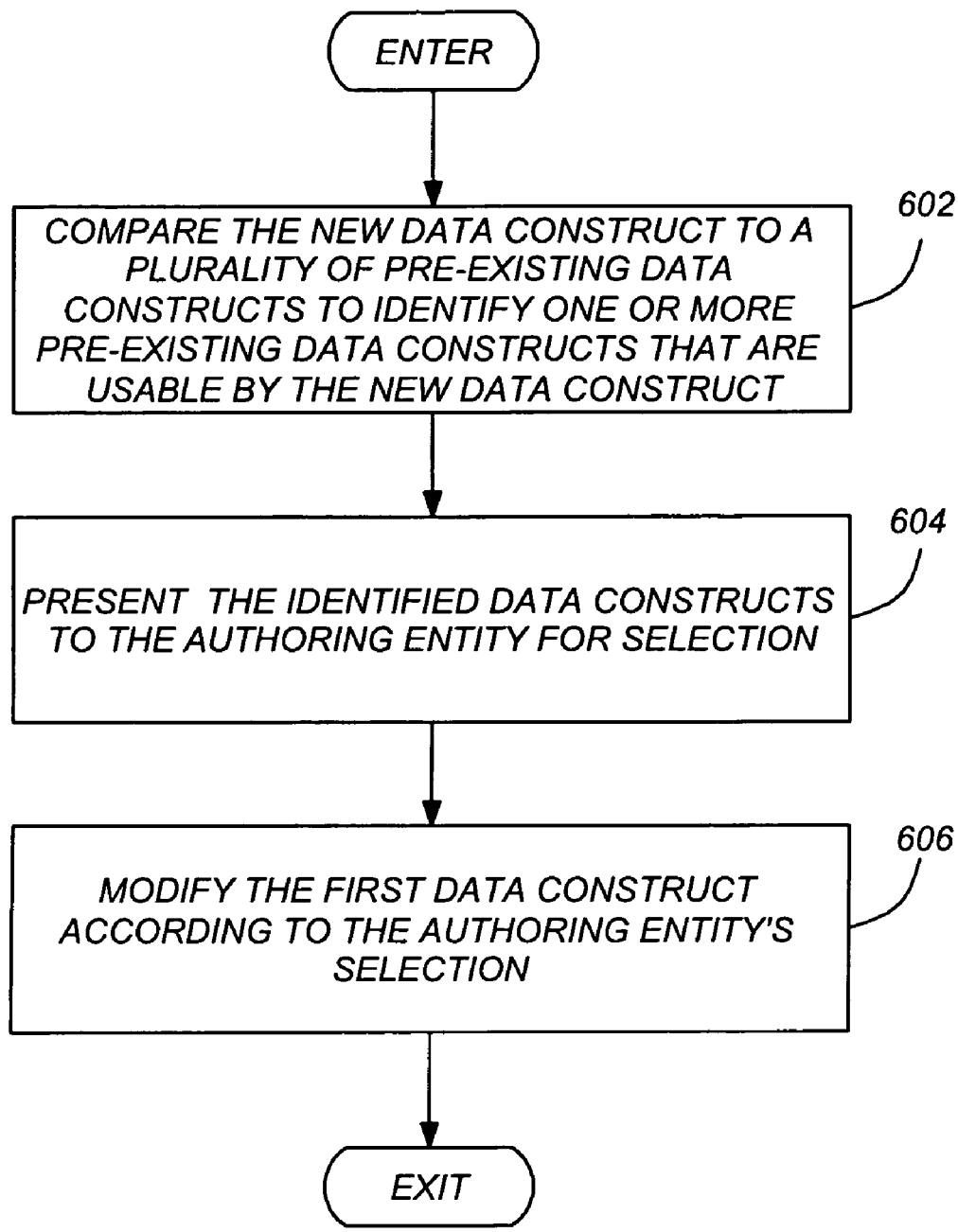
FIG. 6 is a flow chart presenting an illustrative example of process steps that can be used in brokering between the authoring entity and other entities.

FIG. 6 is a flow chart presenting an illustrative example of process steps that can be used in brokering between the authoring entity 104 and other entities 114. In block 602, the new data construct is compared to the plurality of pre-existing data constructs (which may include baseline constructs such as constructs 502-504) to identify pre-existing data constructs that are usable by the new data construct. This can be accomplished by reference to the information in the abstract section 402, data section 404 or the logic section 430 of the data construct. For example, the data description 414 fields of existing data constructs can be compared to the data description of the new data construct to determine whether the pre-existing data construct may be of use to the authoring entity 104 in generating the new data construct. The data type field 416 or author field 410 may also be of use in identifying pre-existing data constructs that may be of use in generating the new data construct. Even the format 422 and data 424 data fields can be used to find pre-existing data constructs of interest. For example, if the data of a new data construct is presented in an NNN-NNNN format, it is reasonable to assume that regardless of the description 414, the number represents a telephone number or part of a social security number. This information can be used to identify pre-existing data constructs of interest.

The search for pre-existing data constructs of interest need not be performed after the entry of the new data construct is completed. Preferably, the search for data constructs of interest is performed before the new data construct is completely defined, as the use of the pre-existing data constructs can significantly reduce the effort involved in generating the new data construct. The search can therefore be performed at periodic intervals while the authoring entity 104 is entering data to define the data construct, after the user enters the data in a particular field (e.g. the description 414 data type 416, format 422, data 424 or logic 430 field(s)).

In block 604, the identified pre-existing data constructs are presented to the authoring entity 104 for selection. The identified pre-existing data constructs can be presented in a drop-down menu headed by the description, author, or any other information. In one embodiment, authoring entity describes a preferred method and interface by which pre-existing data constructs of interest are presented.

The authoring entity 104 then selects which data constructs it would like to use in the new data construct, and the first data construct is modified according to the selection, as shown in block 606. In one embodiment, this is accomplished by simply altering the appropriate fields of the new data construct. For example, if the authoring entity 104 had created a data construct of states, the IBS 102 will have identified the data construct 502 associated with QID 2 as a pre-existing construct of interest. The authoring entity 104 can then simply use QID 2 in the definition of the new data construct (for example, as described further below). Or, an interface can be defined by which the user selects the data construct (e.g. by selecting an icon representing QID 2), and the selected data construct is automatically incorporated into the definition of the new data construct.

Use of the pre-existing data construct can be provided without charge, or on a fee basis. The fee may be a one-time fee, a per-use fee, a percentage fee, or any other fee arrangement. The fee itself can be paid to the authoring entity of the selected pre-existing data construct, the brokering system 102, a third entity, or any combination thereof. Typically, the fee is paid to the authoring entity of the pre-existing data construct, after the brokering system 102 takes a percentage of the fee for itself. Use of the pre-existing data construct may also be bartered between the authoring entity and the user of the data construct, or may be auctioned, if desired.

If the authoring entity 104 desires it, can elect to share the data construct with other entities, either for a fee, or without a fee.

In the foregoing example, the existing data constructs that might be of use to the author of the new data construct (authoring entity 104) are identified and presented to the authoring entity. The present invention can also be used to offer a newly created data construct to the authors of pre-existing data constructs.

Figure 7:
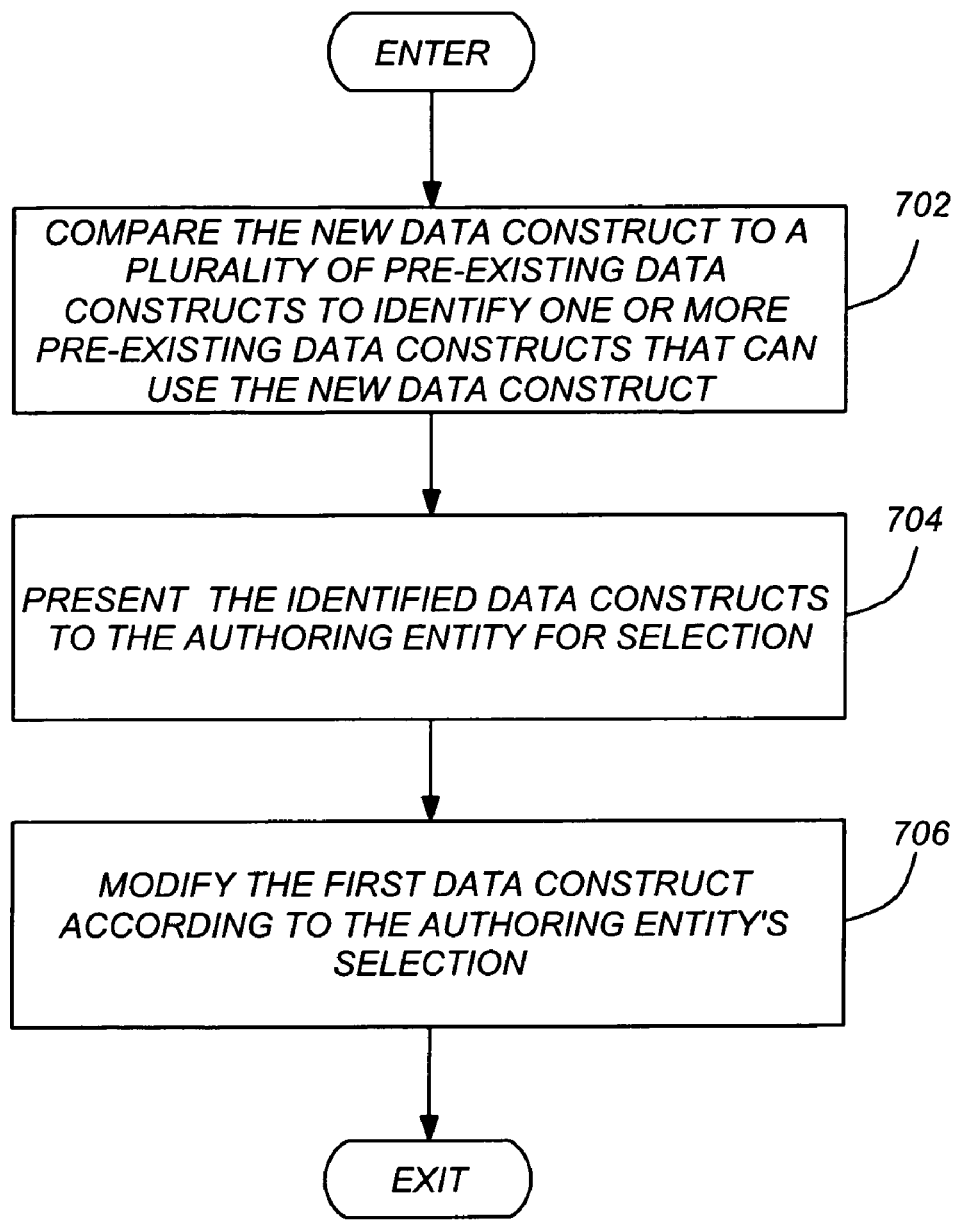
FIG. 7 is a flow chart presenting another illustrative example of process steps that can be used in brokering between the authoring entity and other entities.

FIG. 7 is a flow chart presenting an illustrative example of process steps describing this process. The new data construct is compared to the plurality of existing data constructs to identify pre-existing data constructs that can use the new data construct, as shown in block 702. Then, the identified data constructs are presented to the authoring entities of the pre-existing data constructs, as shown in block 704. This can be done only when the authoring entities of the pre-existing data constructs have requested this information (opt-in) or can be done unless the authoring entities of the pre-existing data constructs have requested to be excluded from receiving this information (opt-out). The pre-existing data constructs can then be modified as desired, as shown in block 706.

An example of the foregoing operations is presented with further reference to FIG. 5. In this example, a second authoring entity 506 using a second computer 508 desires to create a data construct 512 having U.S. telephone numbers. To create this data construct 506, the second authoring entity 506 prepares a first data construct 510 having U.S. area codes. This is accomplished by entering "U.S. Area Codes" in the description field 414, "NNN" in the format data field 422. If the second authoring entity desires to use the information in the U.S. States data construct 502 (in FIG. 5, use of the data constructs of others is indicated by a dashed, rather than a solid line), the second authoring entity 506 also enters "QID 2" in the data type field 416, and defines the data in the data field 424 using a reference to QID 2. Alternatively, the IBS 102 can recognize that the second authoring entity 506 has entered geographical data in the data fields 424, and offer the second authoring entity use of data construct 502. Since data construct 502 is a baseline data construct, use of this data construct would typically be provided without fee. In offering use of data construct 502, the second authoring entity 506 is provided with a description of data construct 502 so that the second authoring entity 506 knows how to use the data in data construct 502.

In the example shown in FIG. 5, the second authoring entity 506 has elected to include "State" information from data construct 502, and has done so via reference to QID 2. Since Los Angeles and Hollywood are both in California, the data includes a reference to index value 1 in the data construct referenced by QID 2, which is "CA". As a result, the data includes the characters "818=Los Angeles (CA)". Since Honolulu and Hilo are both in Hawaii, the data includes a reference to index value 2 in the data construct referenced by QID 2, which is "HI". As a result, the data in the third line includes the characters "808=Hilo (HI)".

The second authoring entity 506 can now generate a data construct of U.S. telephone numbers using the information in data construct 510 for the area code. That is accomplished by entering "U.S. Telephone Numbers" in the description field 414, "N (QID 4) NNN-NNNN" in the format field, and QID 4 in the data type 416 field. Note that data construct 512 need not explicitly include a reference to QID 2, as the reference to QID is inherited by reference to QID 4 (which references QID 2). This need not be the case, however, as the system can be defined such that all references must be explicitly provided.

Now suppose a third authoring entity 514 using a third computer 516 desires to create a data construct 518 that allows a user to generate a zip code from an area code. This can be accomplished by defining a data construct 518 that uses data describing the relationship between U.S. Area Codes and the U.S. States (provided by data construct 510 via reference to QID 4) and Zip Codes and States (provided by data construct 504 via reference to QID 12). Data construct 518 therefore includes a reference QID 7 for data construct 512 (which inherits the reference to QID 4 for data construct 510) and the QID 12 for data construct 504 in the data type field 416. The output format is a zip code, and is therefore defined as "NNNNN-NNNN", and the logic field 430 includes a logical definition describing how the Zip Code is defined from the Area Code.

In the illustrated example, data construct 504 provides the information that:
  90028-0000=CA=Hollywood
  22301-0000=VA=Alexandria
  96825-0000=HI=Hawaii Also note that data construct 510 provides the information that:
  818=Los Angeles (CA)
  323=Hollywood (CA)
  808=Hilo (HI)
  808=Honolulu (HI)

From this information, a relationship that allows the generation of U.S. Area Codes from zip codes can be generated. In other words, since
  90028-0000=CA=Hollywood
and
  323=Hollywood (CA)

both refer to the same U.S. City (Hollywood) it can be inferred that there is a logical relationship between the zip code 90028 and the area code 323. At the same time, it can be inferred that there is a logical relationship between zip code 96825 and the area code 808. Note that the logical relationship need not be 1:1. That is, a single zip code can map to more than one area code, and a particular area code may map to more than one zip code. In this case, the output of data construct 514 may simply provide a list of all of the logical relationships (e.g. list all of the area codes that are logically related to a particular zip code or vice versa), or additional logic and reference to other data constructs can be used to pare down the result until the desired 1:1 logical relationship can be defined.

It is also noted that the data conventions of the data field 424 can be modified to indicate subset and superset status to resolve logical relationship ambiguities, if desired. For example, first data entry of data construct 510 could be:
  818<Los Angeles (CA)

indicating that 818 is a subset of the area codes of Los Angeles. Or if there were multiple cities spanned by a single area code:
  310>Manhattan Beach indicating that the area code 310 includes Manhattan Beach as well as other cites. Likewise, data construct 504 could indicate:
  90028-0000<CA>Hollywood indicating that the zip code 90028 is a subset of the zip codes in CA and that Hollywood is a subset of the cites in CA. Or:
  90028-0000=Hollywood<CA indicating that all of Hollywood has the zip code of 90028-0000 and that only those in Hollywood have a zip code of 90028-0000, and that Hollywood is not the only city in CA.

Such logical relationships can be used in the logical expressions entered into the logic field 430, to implement data constructs having the desired characteristics.

Hardware Environment

Figure 8:
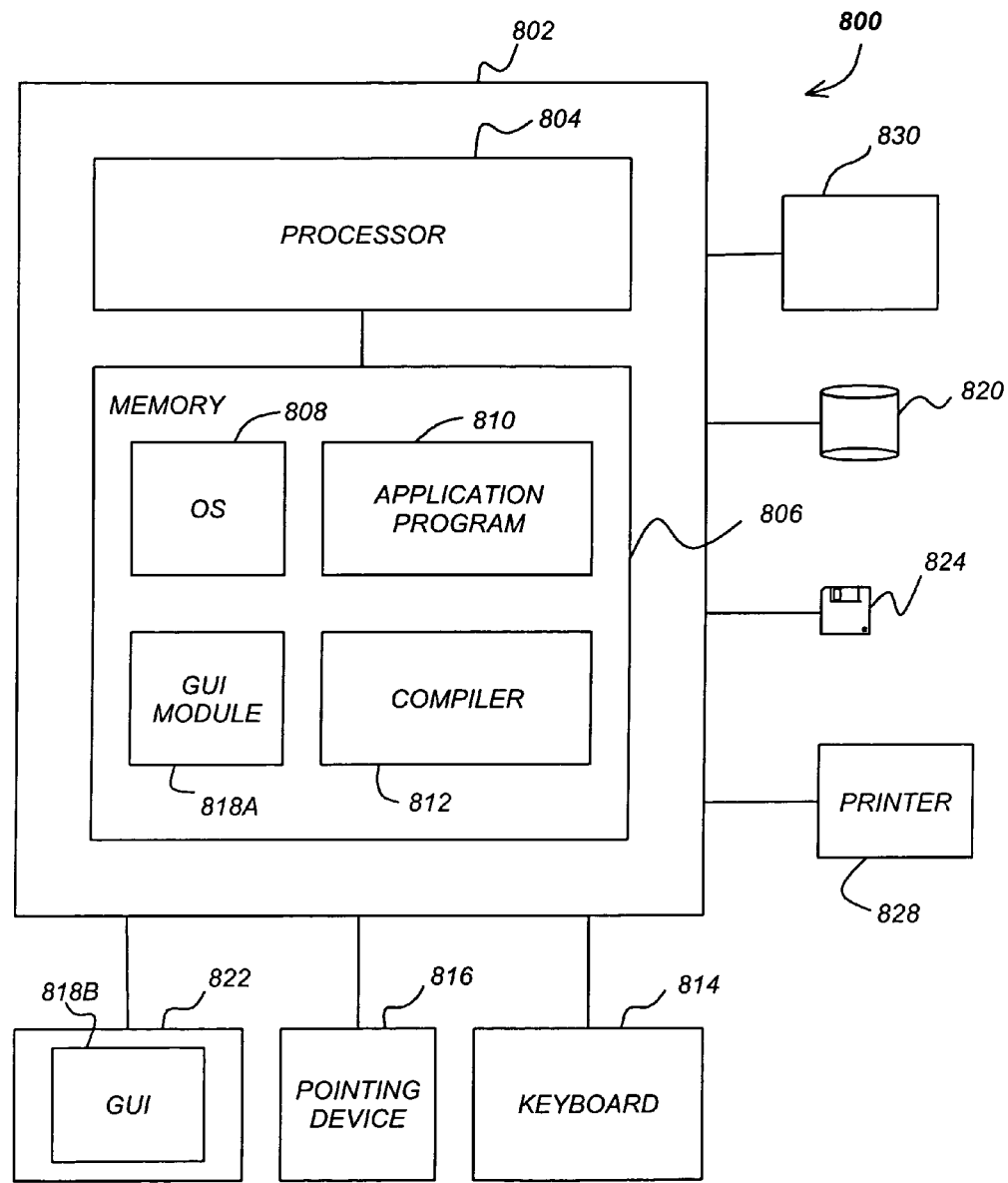
FIG. 8 illustrates an exemplary computer system 800 that could be used to implement the present invention.

FIG. 8 illustrates an exemplary computer system 800 that could be used to implement the present invention. The computer 802 comprises a processor 104 and a memory, such as random access memory (RAM) 806. The computer 802 is operatively coupled to a display 822, which presents images such as windows to the user on a graphical user interface 818B. The computer 802 may be coupled to other devices, such as a keyboard 814, a mouse device 816, a printer, etc. Of course, those skilled in the art will recognize that any combination of the above components, or any number of different components, peripherals, and other devices, may be used with the computer 802.

Generally, the computer 802 operates under control of an operating system 808 stored in the memory 806, and interfaces with the user to accept inputs and commands and to present results through a graphical user interface (GUI) module 818A. Although the GUI module 818A is depicted as a separate module, the instructions performing the GUI functions can be resident or distributed in the operating system 808, the computer program 810, or implemented with special purpose memory and processors. The computer 802 also implements a compiler 812 which allows an application program 810 written in a programming language such as REBOL, C++, FORTRAN, or other language to be translated into processor 804 readable code. After completion, the application 810 accesses and manipulates data stored in the memory 806 of the computer 802 using the relationships and logic that was generated using the compiler 812. The computer 802 also optionally comprises an external communication device such as a modem, satellite link, Ethernet card, or other device for communicating with other computers.

In one embodiment, instructions implementing the operating system 808, the computer program 810, and the compiler 812 are tangibly embodied in a computer-readable medium, e.g., data storage device 820, which could include one or more fixed or removable data storage devices, such as a floppy disc drive 824, hard drive, CD-ROM drive, tape drive, flash drive, memory card, etc. Further, the operating system 808 and the computer program 810 are comprised of instructions which, when read and executed by the computer 802, causes the computer 802 to perform the steps necessary to implement and/or use the present invention. Computer program 810 and/or operating instructions may also be tangibly embodied in memory 806 and/or data communications devices 830, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of brokering information between a plurality of clients using identifiers uniquely defining a plurality of data constructs, comprising the steps of:

accepting a new data construct from a first authoring entity;

assigning a globally unique identifier to the new data construct;

storing the new data construct and the assigned globally unique identifier in a database; and brokering between the first authoring entity and another entity commercially distinct from the first authoring entity to provide the another entity access to the new data construct by reference to the assigned globally unique identifier of the new data construct or to provide the first authoring entity access to at least one of a plurality of pre-existing data constructs for use with the new data construct by reference to a globally unique identifier of the existing data construct;

wherein the step of brokering comprises the steps of:

comparing the new data construct to the plurality pre-existing data constructs to identify one or more pre-existing data constructs that are usable by the new data construct;

presenting the identified data constructs to the first authoring entity for selection; and modifying the new data construct according to the first authoring entity's selection.

2. The method of claim 1, wherein the new data construct comprises one or more of:

(A) a globally unique identifier of at least one of other data constructs that are used by the new data construct;

(B) one or more entries collectively representing a data set of the new data construct, each entry comprising at least one of:

(1) at least a portion of the data set and at least one of:

(a) a definition of a format of the portion of the data set; and (b) a globally unique identifier of an existing data construct defining the format of the one or more entries;

(C) logic defining an output of the new data construct as a function of at least one of:

(1) a globally unique identifier of an existing data construct; and (2) the portion of the data set associated with the new data construct.

3. The method of claim 1, wherein the another entity is a second authoring entity.

4. The method of claim 1, wherein the identified data constructs are presented to the first authoring entity on a fee basis.

5. The method of claim 1, wherein the step of brokering comprises the steps of:

comparing the new data construct to the plurality of pre-existing data constructs to identify pre-existing data constructs that can use the new data construct;

presenting the identified data constructs to the another entity for selection; and modifying the pre-existing data constructs according to the selection of the another entity.

6. The method of claim 5, wherein the identified data constructs are presented to the another entity on a fee basis.

7. The method of claim 1, wherein the step of assigning a globally unique identifier to the new data construct comprises the steps of:

searching an index of data constructs for an existing data construct having properties analogous to new data construct;

assigning the index of an existing data construct having properties analogous to the new data construct to the new data construct if an existing data construct having properties analogous to existing data constructs is found in the search;

generating a globally unique identifier for the new data construct if an existing data construct having properties analogous to the new data construct is not found in the search.

8. The method of claim 1, wherein the globally unique identifier is selected from a list of reserved globally unique identifiers identifying frequently used data constructs.

9. The method of claim 1, further comprising the step of indexing the new data construct and the assigned globally unique identifier of the new data construct.

10. A system for brokering information between a plurality of clients using identifiers uniquely defining a plurality of data constructs, comprising:
 a data processor communicatively coupled to a memory storing instructions for execution by the data processor, the instructions for
  accepting a new data construct from a first authoring entity;
  assigning a globally unique identifier to the new data construct;
  storing the new data construct and the assigned globally unique identifier in a database; and
  brokering between the first authoring entity and another entity commercially distinct from the first authoring entity to provide the another entity access to the new data construct by reference to the assigned globally unique identifier of the new data construct or to provide the first authoring entity access to at least one of a plurality of pre-existing data constructs for use with the new data construct by reference to a globally unique identifier of the existing data construct
 wherein the memory stores further instructions comprising instructions for:
  comparing the new data construct to the plurality pre-existing data constructs to identify one or more pre-existing data constructs that are usable by the new data construct;
  presenting the identified data constructs to the first authoring entity for selection; and
  modifying the new data construct according to the first authoring entity's selection.

11. The system of claim 10, wherein the new data construct comprises one or more of:
 (A) a globally unique identifier of at least one of other data constructs that are used by the new data construct;
 (B) one or more entries collectively representing a data set of the new data construct, each entry comprising at least one of:
  (1) at least a portion of the data set and at least one of:
   (a) a definition of a format of the portion of the data set; and
   (b) a globally unique identifier of an existing data construct defining the format of the one or more entries;
 (C) logic defining an output of the new data construct as a function of at least one of:
  (1) a globally unique identifier of an existing data construct; and
  (2) the portion of the data set associated with the new data construct.

12. The system of claim 10, wherein the another entity is a second authoring entity.

13. The system of claim 10, wherein the identified data constructs are presented to the first authoring entity on a fee basis.

14. The system of claim 10, wherein the memory stores further instructions comprising instructions for:
 comparing the new data construct to the plurality of pre-existing data constructs to identify pre-existing data constructs that can use the new data construct;
 presenting the identified data constructs to the another entity for selection; and
 modifying the pre-existing data constructs according to the selection of the another entity.

15. The system of claim 14, wherein the identified data constructs are presented to the another entity on a fee basis.

16. The system of claim 10, wherein the memory stores further instructions comprising instructions for:
 searching an index of data constructs for an existing data construct having properties analogous to new data construct;
 assigning the index of an existing data construct having properties analogous to the new data construct to the new data construct if an existing data construct having properties analogous to existing data constructs is found in the search; and
 generating a globally unique identifier for the new data construct if an existing data construct having properties analogous to the new data construct is not found in the search.

17. The system of claim 10, wherein the globally unique identifier is selected from a list of reserved globally unique identifiers identifying frequently used data constructs.

18. The system of claim 10, wherein the memory stores further instructions comprising instructions for indexing the new data construct and the assigned globally unique identifier of the new data construct.

19. A method of brokering information between a plurality of clients using identifiers uniquely defining a plurality of data constructs, comprising the steps of:
 accepting a new data construct from a first authoring entity;
 assigning a globally unique identifier to the new data construct;
 storing the new data construct and the assigned globally unique identifier in a database; and
 brokering between the first authoring entity and another entity commercially distinct from the first authoring entity to provide the another entity access to the new data construct by reference to the assigned globally unique identifier of the new data construct or to provide the first authoring entity access to at least one of a plurality of pre-existing data constructs for use with the new data construct by reference to a globally unique identifier of the existing data construct;
 wherein the step of brokering comprises the steps of:
  comparing the new data construct to the plurality of pre-existing data constructs to identify pre-existing data constructs that can use the new data construct;
  presenting the identified data constructs to the another entity for selection; and
  modifying the pre-existing data constructs according to the selection of the another entity.

20. The method of claim 19, wherein the new data construct comprises one or more of:
 (A) a globally unique identifier of at least one of other data constructs that are used by the new data construct;
 (B) one or more entries collectively representing a data set of the new data construct, each entry comprising at least one of:
  (1) at least a portion of the data set and at least one of:
   (a) a definition of a format of the portion of the data set; and
   (b) a globally unique identifier of an existing data construct defining the format of the one or more entries;
 (C) logic defining an output of the new data construct as a function of at least one of:
  (1) a globally unique identifier of an existing data construct; and
  (2) the portion of the data set associated with the new data construct.

21. The method of claim 19, wherein the another entity is a second authoring entity.

22. The method of claim 19, wherein the step of brokering comprises the steps of:
- comparing the new data construct to the plurality pre-existing data constructs to identify one or more pre-existing data constructs that are usable by the new data construct;
- presenting the identified data constructs to the first authoring entity for selection; and
- modifying the first data construct according to the first authoring entity's selection;
- wherein the identified data constructs are presented to the first authoring entity on a fee basis.

23. The method of claim 19, wherein the identified data constructs are presented to the another entity on a fee basis.

24. The method of claim 19, wherein the step of assigning a globally unique identifier to the new data construct comprises the steps of:
- searching an index of data constructs for an existing data construct having properties analogous to new data construct;
- assigning the index of an existing data construct having properties analogous to the new data construct to the new data construct if an existing data construct having properties analogous to existing data constructs is found in the search;
- generating a globally unique identifier for the new data construct if an existing data construct having properties analogous to the new data construct is not found in the search.

25. The method of claim 19, wherein the globally unique identifier is selected from a list of reserved globally unique identifiers identifying frequently used data constructs.

26. The method of claim 19, further comprising the step of indexing the new data construct and the assigned globally unique identifier of the new data construct.

27. A method of brokering information between a plurality of clients using identifiers uniquely defining a plurality of data constructs, comprising the steps of:
- accepting a new data construct from a first authoring entity;
- assigning a globally unique identifier to the new data construct;
- storing the new data construct and the assigned globally unique identifier in a database; and
- brokering between the first authoring entity and another entity commercially distinct from the first authoring entity to provide the another entity access to the new data construct by reference to the assigned globally unique identifier of the new data construct or to provide the first authoring entity access to at least one of a plurality of pre-existing data constructs for use with the new data construct by reference to a globally unique identifier of the existing data construct;
- wherein the step of assigning a globally unique identifier to the new data construct comprises the steps of:
  - searching an index of data constructs for an existing data construct having properties analogous to new data construct;
  - assigning the index of an existing data construct having properties analogous to the new data construct to the new data construct if an existing data construct having properties analogous to existing data constructs is found in the search;
  - generating a globally unique identifier for the new data construct if an existing data construct having properties analogous to the new data construct is not found in the search.

28. The method of claim 27, wherein the new data construct comprises one or more of:
- (A) a globally unique identifier of at least one of other data constructs that are used by the new data construct;
- (B) one or more entries collectively representing a data set of the new data construct, each entry comprising at least one of:
  - (1) at least a portion of the data set and at least one of:
    - (a) a definition of a format of the portion of the data set; and
    - (b) a globally unique identifier of an existing data construct defining the format of the one or more entries;
- (C) logic defining an output of the new data construct as a function of at least one of:
  - (1) a globally unique identifier of an existing data construct; and
  - (2) the portion of the data set associated with the new data construct.

29. The method of claim 27, wherein the another entity is a second authoring entity.

30. The method of claim 27, wherein the step of brokering comprises the steps of:
- comparing the new data construct to the plurality pre-existing data constructs to identify one or more pre-existing data constructs that are usable by the new data construct;
- presenting the identified data constructs to the first authoring entity for selection; and
- modifying the first data construct according to the first authoring entity's selection;
- wherein the identified data constructs are presented to the first authoring entity on a fee basis.

31. The method of claim 27, wherein the step of brokering comprises the steps of:
- comparing the new data construct to the plurality of pre-existing data constructs to identify pre-existing data constructs that can use the new data construct;
- presenting the identified data constructs to the another entity for selection; and
- modifying the pre-existing data constructs according to the selection of the another entity;
- wherein the identified data constructs are presented to the another entity on a fee basis.

32. The method of claim 27, wherein the globally unique identifier is selected from a list of reserved globally unique identifiers identifying frequently used data constructs.

33. The method of claim 27, further comprising the step of indexing the new data construct and the assigned globally unique identifier of the new data construct.

34. A system for brokering information between a plurality of clients using identifiers uniquely defining a plurality of data constructs, comprising:
- a data processor communicatively coupled to a memory storing instructions for execution by the data processor, the instructions for
  - accepting a new data construct from a first authoring entity;
  - assigning a globally unique identifier to the new data construct;
  - storing the new data construct and the assigned globally unique identifier in a database; and
  - brokering between the first authoring entity and another entity commercially distinct from the first authoring entity to provide the another entity access to the new data construct by reference to the assigned globally unique identifier of the new data construct or to provide the first authoring entity access to at least one of a plurality of pre-existing data constructs for use with the new data construct by reference to a globally unique identifier of the existing data construct;

wherein the memory stores further instructions comprising instructions for:

comparing the new data construct to the plurality of pre-existing data constructs to identify pre-existing data constructs that can use the new data construct;

presenting the identified data constructs to the another entity for selection; and modifying the pre-existing data constructs according to the selection of the another entity.

35. The system of claim 34, wherein the new data construct comprises one or more of:

(A) a globally unique identifier of at least one of other data constructs that are used by the new data construct;

(B) one or more entries collectively representing a data set of the new data construct, each entry comprising at least one of:

(1) at least a portion of the data set and at least one of:

(a) a definition of a format of the portion of the data set; and (b) a globally unique identifier of an existing data construct defining the format of the one or more entries;

(C) logic defining an output of the new data construct as a function of at least one of:

(1) a globally unique identifier of an existing data construct; and (2) the portion of the data set associated with the new data construct.

36. The system of claim 34, wherein the another entity is a second authoring entity.

37. The system of claim 34, wherein the memory stores further instructions comprising instructions for:

comparing the new data construct to the plurality pre-existing data constructs to identify one or more pre-existing data constructs that are usable by the new data construct;

presenting the identified data constructs to the first authoring entity for selection; and modifying the first data construct according to the first authoring entity's selection; wherein the identified data constructs are presented to the first authoring entity on a fee basis.

38. The system of claim 34, wherein the identified data constructs are presented to the another entity on a fee basis.

39. The system of claim 34, wherein the memory stores further instructions comprising instructions for:

searching an index of data constructs for an existing data construct having properties analogous to new data construct;

assigning the index of an existing data construct having properties analogous to the new data construct to the new data construct if an existing data construct having properties analogous to existing data constructs is found in the search; and generating a globally unique identifier for the new data construct if an existing data construct having properties analogous to the new data construct is not found in the search.

40. The system of claim 34, wherein the globally unique identifier is selected from a list of reserved globally unique identifiers identifying frequently used data constructs.

41. The system of claim 34, wherein the memory stores further instructions comprising instructions for indexing the new data construct and the assigned globally unique identifier of the new data construct.

42. A system for brokering information between a plurality of clients using identifiers uniquely defining a plurality of data constructs, comprising:

a data processor communicatively coupled to a memory storing instructions for execution by the data processor, the instructions for accepting a new data construct from a first authoring entity;

assigning a globally unique identifier to the new data construct;

storing the new data construct and the assigned globally unique identifier in a database; and brokering between the first authoring entity and another entity commercially distinct from the first authoring entity to provide the another entity access to the new data construct by reference to the assigned globally unique identifier of the new data construct or to provide the first authoring entity access to at least one of a plurality of pre-existing data constructs for use with the new data construct by reference to a globally unique identifier of the existing data construct;

wherein the memory stores further instructions comprising instructions for:

searching an index of data constructs for an existing data construct having properties analogous to new data construct;

assigning the index of an existing data construct having properties analogous to the new data construct to the new data construct if an existing data construct having properties analogous to existing data constructs is found in the search; and generating a globally unique identifier for the new data construct if an existing data construct having properties analogous to the new data construct is not found in the search.

43. The system of claim 42, wherein the new data construct comprises one or more of:

(A) a globally unique identifier of at least one of other data constructs that are used by the new data construct;

(B) one or more entries collectively representing a data set of the new data construct, each entry comprising at least one of:

(1) at least a portion of the data set and at least one of:

(a) a definition of a format of the portion of the data set; and (b) a globally unique identifier of an existing data construct defining the format of the one or more entries;

(C) logic defining an output of the new data construct as a function of at least one of:

(1) a globally unique identifier of an existing data construct; and (2) the portion of the data set associated with the new data construct.

44. The system of claim 42, wherein the another entity is a second authoring entity.

45. The system of claim 42, wherein the memory stores further instructions comprising instructions for:

comparing the new data construct to the plurality pre-existing data constructs to identify one or more pre-existing data constructs that are usable by the new data construct;

presenting the identified data constructs to the first authoring entity for selection; and modifying the first data construct according to the first authoring entity's selection;

wherein the identified data constructs are presented to the first authoring entity on a fee basis.

46. The system of claim 42, wherein the memory stores further instructions comprising instructions for:

comparing the new data construct to the plurality of pre-existing data constructs to identify pre-existing data constructs that can use the new data construct;

presenting the identified data constructs to the another entity for selection; and modifying the pre-existing data constructs according to the selection of the another entity;

wherein the identified data constructs are presented to the another entity on a fee basis.

47. The system of claim 42, wherein the globally unique identifier is selected from a list of reserved globally unique identifiers identifying frequently used data constructs.

48. The system of claim 42, wherein the memory stores further instructions comprising instructions for indexing the new data construct and the assigned globally unique identifier of the new data construct.

* * * * *